United States Patent Office 3,314,477
Patented Apr. 18, 1967

3,314,477
WELL TREATMENT EMPLOYING A
HYPERGOLIC SYSTEM
Billy G. Boevers, Broken Arrow, and Paul E. Woodward and Curtis W. Crowe, Tulsa, Okla., and Archie N. Barron, Houston, Tex., assignors to The Dow Chemical Company, Midland, Mich., a corporation of Delaware
No Drawing. Filed Dec. 11, 1964, Ser. No. 417,791
13 Claims. (Cl. 166—38)

The invention is concerned with treating fluid-bearing earth formations traversed by a well, commonly referred to as treating a well, wherein a composition is injected down the wellbore of a well and forced back into the formation to effectuate an improvement in the conditions of the well or in the quantity of fluid being produced from the well.

Among the fluids of economic importance found naturally in the earth, are oil, gas, brine, and water. The desired fluid is contained in voids and interstices of a porous rock stratum in the formation. The desired fluid is almost universally obtained from the formation by drilling a well into the fluid-bearing stratum and thereafter producing the fluid, either by the force of natural pressure existing in the formation or by the pressure created by means of either a pumping system or by the injection of fluids such as water or a gas into the formation, usually via other wells in the same formation.

In order that the desired fluids continue to be produced from such formation, it is necessary that communication be established and maintained between the fluid-bearing portions of the formation beyond the immediate vicinity of the wellbore penetrating the formation and the wellbore. To attain this end it is often necessary to stimulate production from the formation by such expedients as injecting a chemical which attacks the reservoir rock and removes portions thereof thus providing channels, or by hydraulic pressures which create fractures in the formation or by explosives planted in the formation which detonate and thereby crack and rubblize portions of the formation.

One of the problems associated with treatment of fluid-bearing formations employing a treating liquid is seepage of the treating liquid into a porous formation thereby lessening the efficacy of the treatment. Numerous agents have been admixed with treating liquids in efforts to inhibit the seepage or fluid loss of treating liquids into the formation. Progress has been made to overcome fluid loss to the formation.

For example in hydraulic fracturing, fluid-loss agents have been admixed with the liquid being employed which tend to plug off the pores of the formation thereby to permit hydraulic pressure against the exposed faces of the formation to rise more rapidly to pressures which fracture the formation. Certain polymers have recently been suggested for use as fluid-loss agents in hydraulic fracturing.

Also recently it has been suggested that a polymer, which is dispersible and swellable but not soluble in water but substantially unaffected by contact with the oil, be admixed with an oil-type treating liquid and injected into a formation and positioned therein so that contact with formation water and aqueous solutions such as brine will cause the polymer to swell and thereby plug off or inhibit water intrusion.

Another recent advance in well treatment is the use of oxidizing and reducing agents (fuels) which, when brought into contact with each other at the conditions existing at the level of the formation where treatment is to be carried out, form a hypergolic mixture, i.e. one which spontaneously ignites and as a result, fractures and rubblizes the formation in the vicinity of the hypergolic mixture.

Various inventive concepts have come forth in the area of explosive formation treatments. However, a fully satisfactory answer has not been found for meeting all the requirements of the complexity of circumstances that exist in the various fluid-bearing formations requiring treatment.

When employing a hypergolic mixture in the treatment of a well, the preferred oxidizer to employ has been found to be either concentrated nitric acid (65 percent or more $HNO_3$ in water) or fuming nitric acid (from about 3 to about 30 percent $NO_2$ dissolved in concentrated nitric acid). Heretofore, the employment of either of these acids in the formation, to provide a hypergolic mixture with a fuel, has presented problems. It is essential in such type of operation that the fuel and the oxidizer be maintained out of contact with one another until both are in the formation where fracturing is desired. To provide this condition heretofore, either a fuel which does not produce a hypergolic mixture with an oxidizer must be employed, followed by an electrical or chemical igniter or detonator which ignites or detonates the non-hypergolic mixture, or the oxidizer and a fuel which does provide a hypergolic mixture must be maintained separately prior to and during injection. This form of treatment is an advance in the art but is accompanied by the concern and difficulties of handling the liquid nitric acid or fuming nitric acid and the added undesirable loss of reactants by seepage into the formation prior to the detonation or combustion.

The present invention embodies an improved combustion fracturing method, employing a liquid oxidizer and at least one fuel which when in contact with the oxidizer forms a hypergolic mixture, the improvement residing in imbibing a first liquid component of the hypergolic mixture, i.e. either the fuel or the oxidizer, in a selected polymer; injecting the thus imbibed fuel or oxidizer into a wellbore penetrating a formation to be treated; placing a spacer which may be a resilient tightly fitting plug or a relatively inert liquid down the wellbore above the first component; and then injecting a second liquid component of the hypergolic mixture down the wellbore, and forcing it, together with any first component remaining in the wellbore together with the spacer means, back into the formation whereby the gelled component and the liquid component are intermixed causing spontaneous combustion which progresses through the mixture creating channels and passageways in the formation.

The polymer so employed not only provides a much more readily handled component for use in forming a hypergolic mixture in situ in the formation, but provides for a gradual or relatively slow rate of combustion (as opposed to the well-nigh instantaneous explosion heretofore associated with hypergolic mixtures). Such slower combustion results in the creation of longer more serpentine and more numerous channels in the formation. The polymer, by providing a gelled first component also greatly lessens fluid loss thereof to the formation prior to combustion. When nitric acid or fuming nitric acid is so gelled it is much safer than as a liquid.

In carrying out the invention, one of two general procedures is followed. Since the imbibed component is not acceptably flowable, then either an excess of the liquid fuel or oxidizer beyond that which is imbibed by the polymer must be employed or the imbibed component must be slurried in a suitable carrier vehicle, e.g., an oil-base or aqueous-base liquid, and the slurry so made injected down the well.

The polymer to employ, when the component which is to be gelled is the oxidizing agent, is selected from cross-linked water-insoluble polymers prepared from the N-vinyl-substituted organic heterocyclic nitrogen monomers having the structure:

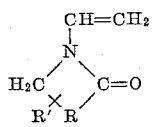

wherein R is —$CH_2O$—, —$CH_2OCH_2$—, —$(CH_2)_2$— or —$(CH_2)_3$— and wherein R' is an alkyl group having 1 or 2 carbon atoms.

Illustrative of such polymers are poly(N-vinyl-morpholinone), poly(N-vinyl-2-oxazolidinone), poly(N-vinylpyrrolidone), poly(N-vinylpiperidone) and polymerized alkyl nuclear-substituted derivatives thereof.

As illustrative of alkyl nuclear-substituted derivatives for use in the practice of the invention are polymers of N-vinyl-5-methyl-2-oxazolidinone, N-vinyl-4-ethyl oxazolidinone, N-vinyl-3-methyl morpholinone, N-vinyl-3-ethyl pyrrolidone, and N-vinyl-5-methyl piperidone.

A polymer useful in the practice of the invention may be prepared either by use of a chemical cross-linking agent or by irradiation, or by a combination of both. In any case a monomer having the generic formula given above or a linear polymer previously prepared is cross-linked either in mass, i.e. without use of a liquid reaction medium such as water, or in an aqueous solution. It is preferable that an aqueous solution of at least 5 percent concentration be employed. Best results are obtained when a concentration of between 20 percent and 85 percent (and usually between 25 and 50 percent) by weight of the reaction mixture is employed. When a chemical cross-linking agent is employed, it is employed in an amount of between 0.02 and 10.0 percent (preferably between 0.2 and 5.0 percent), based on the weight of the reaction mixture. References which discuss such polymerization techniques include U.S. Patent 2,810,716, Jr. of Polymer Science, vol. 23, page 355 (1957), and Jr. of Physical Chemistry, vol. 63, page 1052 (1959). Cross-linking agents to employ include divinyl benzene and N,N'-methylene-bisacrylamide. Choice of cross-linking agent depends in part on the liquid to be subsequently gelled and the use to which the so gelled composition is to be used.

When the cross-linked polymer is prepared by irradiation techniques, between 0.5 and 15.0 megarads are usually used and preferably between 1.0 and 3.0 megarads. The extent of irradiation is that which produces a polymer, insoluble but swellable in aqueous liquids. Care must be exercised, however, to avoid cross-linking the polymer to such an extent that it is no longer sufficiently swellable in aqueous liquids.

As illustrative of a procedure by which a polymer useful in the invention is made, a solution of linear polyvinylmorpholinone—85 percent by weight in water—is given a dosage of radiation of 0.75 megarad, at a dosage rate of 0.3 megarad per hour.

As a further illustration of a procedure for obtaining a polymer useful in the practice of the invention is illustrated by the following example: An aqueous solution of a 20 percent by weight N-vinylpyrrolidone, containing 0.44 percent by weight of N,N'-methylenebisacrylamide as a cross-linking agent, is polymerized by adding 0.025 percent by weight of α,α'-azobisisobutyronitrile. The solution polymerizes to give a polymer which gels 51 grams of water or 60 grams of 0.1 N hydrochloric acid per gram of polymer.

Cross-linked poly(N-vinylpyrrolidone) is the preferred polymer to employ to gel the acid component.

Polymers which may be employed to gel the fuel component may be any one of the above. In addition thereto, such dispersible but insoluble polymers as that prepared by reacting a diisocyanate with a polyglycol. The molecular weight of the polyglycol so employed is between about 2,000 and about 50,000 and preferably between about 4,000 and about 20,000. In order that the resulting polymer be swellable but insoluble in water or aqueous solutions, the molar ratio of the diisocyanate to the polyglycol is carefully controlled to be between about 2 and 3, with a preferred molar ratio of the diisocyanate to the polyglycol of between about 2.1 and 2.8. A molar ratio of diisocyanate to the polyglycol of less than 2 tends to make the resulting polymer too water-soluble and a molar ratio of greater than 3 tends to make the resulting polymer too dimensionally stable to swell sufficiently when in contact with water. The preferred polyglycols to employ are polyoxypropylene glycol or polyoxyethylene glycol. Although either an aliphatic or aromatic diisocyanate may be employed, toluene diisocyanate being particularly readily available on the market, is commonly employed.

The following procedure illustrates the preparation of the polyurethane polymer to employ in the practice of the invention: 100 parts by weight of a suitable polyglycol such as polyoxyethylene glycol or polyoxypropylene glycol, of a molecular weight on the order of 20,000, and containing about 500 parts per million of sodium as sodium acetate, are mixed with about 1200 parts by weight of benzene in a dry reaction vessel equipped with stirring and heating facilities. The mixture is heated to remove water. Following this, about 1.3 parts by weight of tolylene diisocyanate are added to the reaction mixture and the temperature brought to about 80° C. and held for 1.5 hours; another 1.3 parts tolylene diisocyanate are added to the reaction mixture which is maintained at about 80° C. for a second period of about 1.5 hours. At this point, acetic anhydride is added in a mole-to-mole ratio to the tolylene diisocyanate and the temperature is continued at 80° C. for one-half hour. The limited cross-linked polyurethane polymer which is thus produced is separated from the benzene, dried, and ground to a particle size such that it substantially passes through a 20-mesh sieve, but is retained on a 200-mesh sieve (U.S. Bureau of Mines Standard Sieve Series). Particles within this size range are of a preferable size for this invention, although particles of a narrower range of size are satisfactory. Particles which pass through about a No. 4 to No. 6-mesh sieve and range downwardly to as fine as those retained upon a 325-mesh sieve or less are operable in the invention, but other sizes of the swellable particles may be used. The degree of retardation of the action of acid employing the smaller particles is lessened because of the relatively fast diffusion of acid from the small particles and consequently these particles are not preferred. The upper limit of the size of particles is governed primarily by the size of the fracture openings within the formation during injection of the acid-swollen polymer particles. The particles should be of such size that when swollen they enter the formation without significant shearing, so as to obviate the likelihood of plugging of the passageways at their mouths.

The polymer may also be prepared by suspension polymerization as exemplified by the following procedure: 3.3 parts by weight of dimethyldioctadecyl ammonium bentonite are dispersed in 300 parts by weight, of kerosene and heated to about 100° C. To this are added 150 parts by weight of polyoxyethylene glycol, of a molecular weight of about 9,000, while maintaining the temperature at about 95° to 100° C. About 45 parts by weight of a light hydrocarbon liquid such as heptane, are added and the moisture present in the components is removed by heating under a partial vacuum. The mixture is brought to about 65° C. and 4.5 parts of tolylene diisocyanate is added, followed by the addition of 0.07 part by weight of triethylenediamine contained in 7 parts by weight of benzene. The resulting reaction is allowed to continue for one-half hour at about 65° C. when 2.5 parts by weight of acetic anhydride are added. The reactants are held for another one-half hour at about 65° C., then allowed to cool. Spherical particles of polymer, up to about 0.2"

in diameter, are formed. When soaked in hydrochloric acid solution, the particles swell to about forty times their original volume.

The amount of polymer to employ is that which will satisfactorily gel the liquid oxidizer or fuel being used. As little as 0.05 weight percent of poly(N-vinylpyrrolidone), for example, when admixed with 14 percent red fuming nitric acid produced measurable viscosity increase. On the other hand, when attempts were made to employ poly(N-vinylpyrrolidone) in 14 percent red fuming nitric acid in a concentration as high as 15.0 percent by weight, the resulting composition became too viscous to attain complete mixing. The polymer is found to be highly effective in amounts between about 0.5 and 10 percent by weight, from about 1.0 to 4 percent usually being the optimum amount to employ.

Typical of the fuels to employ for forming hypergolic mixtures for use in the invention are the following: amines, alkylbenzenes, sulfur-containing organic compositions, monoalcohols, glycols, ketones, unsaturated hydrocarbons, and the like. The preferred amines to employ are the unsaturated or aromatic amines. Among the sulfur-containing compositions to employ is butylmercaptan or amylmercaptan. The preferred alcohol to employ is furfuryl alcohol. Illustrative of a satisfactory unsaturated hydrocarbon to employ is dicyclopentadiene. A particularly effective fuel mixture to employ is one comprising aniline and furfuryl alcohol. Fuels which do not make a hypergolic mixture when admixed with an oxidizer may be employed with a fuel which does make such hypergolic mixture so long as the amount of the non-hypergolic fuel does not render the entire resulting mixture non-hypergolic.

In order to ascertain whether or not the fuel employed is hypergolic the following test is set forth for use when desired:

(1) Place 0.5 to 1.0 milliliter of the fuel being considered in a bomb provided with a pressure gauge and temperature gauge.

(2) Add the selected oxidizer, dropwise by means of a syringe, equipped with a hypodermic needle, to the fuel.

(3) If ignition occurs and continues as the oxidizer is fed dropwise, the mixture clearly is hypergolic.

(4) If ignition does not occur upon the addition of oxidizer, the bomb may be heated to the temperature of the level of the formation to be treated. If ignition then occurs, the mixture is hypergolic.

(5) If ignition does not occur upon the addition at such temperature, the bomb may be pressurized to the pressure existing at the level of the formation to be treated. If ignition occurs, as evidenced by the changes in temperature and pressure within the bomb, the mixture is hypergolic for purposes of the invention.

The ratio of fuel to oxidizer to employ is such that an effective hypergolic mixture results upon the contact thereof in the formation. Any amount of selected fuel or oxidizing agent, as one component, will react with the chemical equivalent amount of the component in contact therewith under the conditions existent in the formation. It is clear, of course, that the reaction will continue only until either component in contact with the other is exhausted. An effective hypergolic mixture is one that continues to burn, as commingling of the components of the mixture occurs, to an extent sufficient to attain fracturing and shattering of the formation. Between 40 and 60 percent by volume of each component is customarily used. However, as little as about 10 percent of one and balance, to make a total of 100 percent mixture, of the other component of the mixture, is quite satisfactory. Less than about 10 percent of either component and balance of others is operable but is not recommended because the reaction, as stated, will cease when one or the other component is spent.

One embodiment of the invention is illustrated by the following example.

*Example 1*

Poly(N-vinylpyrrolidone) is thoroughly admixed with red fuming nitric acid in an amount of about 100 pounds of polymer per 1000 gallons of red fuming nitric acid. The polymer imbibes the acid. The resulting polymer-acid composition, when thus thoroughly mixed and substantially free of oxidizing contaminants, is relatively safe to handle, being satisfactorily stable against ignition or detonation at pressure tests at 1000 p.s.i. and temperatures up to 250° F., although some degradation of polymer may be evidenced at such advanced temperature. The acid thus imbibed in the polymer is admixed with a suitable vehicle, which does not form a hypergolic mixture with the imbibed acid at temperatures and pressures existing in the well to be treated, e.g., a hydrocarbon such as crude oil, diesel oil, or kerosene, or excess acid, and injected down a wellbore penetrating a fluid-bearing formation. Preferably the well is provided with a casing, perforated at the fluid-bearing level, and a tubing therein and packer located in the annulus formed by the casing and tubing. A resilient plug is usually positioned in the wellbore above the first component and a spacer liquid then injected. Viton, a resilient but tough copolymer of hexafluoropropylene and vinylidene fluoride, is readily adaptable for the making of resilient plugs for the purpose. The spacer liquid is preferably an aqueous dispersion of increased viscosity, e.g. gelled or thickened water. Water admixed from 0.1 to 1.0 percent by weight of a natural gum such as guar gum or of a high molecular weight polymer is recommended. High molecular weight polyacrylamide is particularly suitable as the spacer liquid. The spacer liquid may then be followed by a second plug, e.g., one of Viton. A reducing liquid, which forms a hypergolic mixture with the acid when in contact therewith, e.g., furfuryl alcohol, is then injected down the well preferably followed by a third spacer plug and that in turn by a displacing liquid, e.g., water or brine at sufficient pressure to displace the liquids from the wellbore and force them into the formation. Intermixing of fuel and oxidizer takes place in the formation resulting in spontaneous ignition. Combustion thus ensues, which is gradual and continuous, progressing outwardly from the wellbore until the fuel or the oxidizer is exhausted. The result is the creation of channels and passageways which provide improved communication between the fluid-bearing formation and the wellbore. Channels created by such combustion are considerably more extensive than those created by conventional fracturing.

The following example is illustrative of a second embodiment of the invention.

*Example 2*

The well to be treated was of depth of 490 feet and was provided with a 5½-inch casing and a 2-inch tubing and a packer positioned in the annulus formed by the casing and tubing. The casing was perforated, opposite the sandstone formation to be treated, at a depth of about 483 feet. The packer was set to close off the annulus between the tubing and the casing at a depth of 472 feet (about 11 feet above the formation to be treated). 50 gallons of furfuryl alcohol were admixed with 15 pounds of tolylene diisocyanate-polypropylene glycol polymer beads. The polypropylene glycol employed in the preparation of the polymer had a molecular weight of about 9,000. Mixing of the alcohol and polymer was carried out in an open drum employing an impeller type mixer known in the industry as a "Lightnin" mixer. After the furfuryl alcohol containing the polymer, which consisted of imbibed fuel plus sufficient excess fuel to provide a fluid composition were injected, a spacer liquid, which had been prepared by admixing polyacrylamide with water in an amount sufficient to give viscosity of 150 centipoises, was pumped down the tubing at the rate of about 6 gallons per minute until about a total of about 12 gallons had been thus injected. A second plug was then inserted into the tubing. Thereafter 50 gallons of fuming nitric acid were injected into the tubing at the rate of 10 gallons per minute. Thereafter water was pumped down the tubing until a total of 24 barrels had been injected for the purpose of displacing the fuel, spacer liquid, and acid into the formation. Shortly after the water injection of the last step had been started there was a pressure increase of about 1000 p.s.i. Thereafter abrupt pressure changes varying between 950 and 1600 p.s.i.g. took place, indicating that a series of reactions of the hypergolic mixture were taking place in the formation. The results are shown in the table.

The following example further illustrates the embodiment of Example 2.

*Example 3*

This example was carried out in the same well, as was Example 2, except the well was plugged off to give a total depth of 450.5 feet. The 5½-inch casing was perforated at 447 feet. The amount of furfuryl alcohol employed was 55 gallons which contained 16.5 pounds of the tolylene diisocyanate-polypropylene glycol polymer employed in Example 2. The spacer fluid consisted of 10 gallons of the thickened water employed in Example 2. The results are also shown in the table.

bore at sufficient pressure to displace substantially all of said first and second components from the wellbore and into the formation whereby they are intermixed in the formation.

2. The method according to claim 1 wherein the oxidizer is said first component which is gelled with said polymer.

3. The method according to claim 2 wherein the oxidizer is selected from the class consisting of concentrated nitric acid and fuming nitric acid.

4. The method according to claim 2 wherein the polymer is a cross-linked polymer selected from the class consisting of polymers prepared by polymerizing a polymerizable mixture consisting essentially of N-vinyl-substituted organic heterocyclic nitrogen monomers having

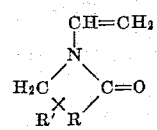

wherein R is selected from the class consisting of $$-CH_2O-$$
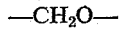
$-CH_2OCH_2-$, $-(CH_2)_2-$, and $-(CH_2)_3-$ and R' is an alkyl group having 1 to 2 carbon atoms.

TABLE I.—SUMMARY OF FIELD TESTS

| Example No. | Total Depth of Well in Ft. | No. of Perforations and Depth in Ft. | Depth of Set Packer in Ft. | Volume of Fuel[1] in Gal. | Volume of Oxidizer[2] in Gal. | Volume of Spacer[3] in Gal. | Maximum Pressure in p.s.i.g. due to in situ combustion | No. of Pressure Surges and Range in p.s.i.g. | Maximum BHT,[4] °F. |
|---|---|---|---|---|---|---|---|---|---|
| 2 | 490 | 4 at 483 | 472 | 50 | 50 | 12 | 1,600 | 10; 100–1,600 | 148 |
| 3 | 450.5 | 6 at 447 | 437 | 55 | 50 | 10 | 1,150 | 3; 750–1,150 | 237 |

[1] FA=furfuryl alcohol containing 0.3 pound of tolylene diisocyanate-polypropylene polymer per gallon.
[2] RFNA=14% Red Fuming Nitric Acid.
[3] The spacer liquid was water containing sufficient polyacrylamide to give a viscosity of 150 centipoises.
[4] BHT means bottom hole temperature.

Reference to the table shows that the hypergolic mixtures, created in the formation, according to the practice of the invention, wherein at least one of the components of the hypergolic mixture is imbibed or gelled by the imbibition thereof by a selected polymer, resulted in pressures of at least 1150 pounds per square inch where the components of the mixture entered the formation at a depth of 447 feet and a pressure of 1600 pounds per square inch when they then entered the formation at 483 feet (measured at the earth's surface). This is a marked increase over the maximum pressures of 600 pounds per square inch formerly obtained by hydraulic fracturing.

Having described our invention, what we claim and desire to protect by Letters Patent is:

1. The method comprising the steps of: (1) Admixing with a first component of a hypergolic mixture selected from liquid fuels and liquid oxidizers a polymer swellable and dispersible in said component but insoluble therein in an amount sufficient to imbibe said component; (2) admixing a liquid, with the polymer containing the so imbibed component, selected from the class consisting of additional liquid component and aqueous and hydrocarbon liquids substantially chemically inert to the component of said hypergolic mixture and to the polymer in an amount to render the resulting composition flowable; (3) injecting the flowable first component composition into the wellbore of a well; (4) positioning a spacer means in the wellbore above said flowable first component composition; (5) injecting a second component of a hypergolic mixture selected from the class consisting of an oxidizer, when said first component is a fuel, and a fuel which makes a hypergolic mixture when admixed with the oxidizer, when said first component is an oxidizer; and (6) injecting a displacing liquid into the wellbore at sufficient pressure to displace substantially all 5. The method according to claim 4 wherein the polymer is cross-linked poly(N-vinylpyrrolidone).

6. The method according to claim 1 wherein the polymer employed, when fuel is the first component, is the copolymer of a diisocyanate and a polyoxyalkylene glycol, prepared by polymerizing a diisocyanate and polyoxyalkylene glycol in a molar ratio of between about 2 and 3 and wherein the glycol employed has a molecular weight of between 2,000 and 50,000.

7. The method according to claim 1 wherein the spacer means is selected from the class consisting of aqueous solutions and dispersions having a viscosity of at least about 50 centipoises which are chemically inert to said first and second components in the wellbore.

8. The method according to claim 1 wherein said spacer means is a plug of a solid resilient material inserted between the fuel and the oxidizer.

9. The method according to claim 8 wherein said thickening agent is polyacrylamide.

10. The method according to claim 1 wherein the spacer means is aqueous liquid thickened by admixture therewith of a thickening agent selected from the class consisting of natural gums and synthetic water-dispersible polymers.

11. The method according to claim 1 wherein said spacer means is a thickened aqueous liquid and a solid resilient plug in combination.

12. The method according to claim 1 wherein said first component is employed in an amount in excess of that which is imbibed by the polymer to render said component flowable.

13. The method according to claim 1 wherein said first component is admixed with a carrier liquid which is chemically inert to the components in the wellbore.

(References on following page)

References Cited by the Examiner

UNITED STATES PATENTS

| | | | |
|---|---|---|---|
| 2,889,884 | 6/1959 | Henderson et al. | 166—38 |
| 3,075,463 | 1/1963 | Eilers et al. | 166—36 |
| 3,181,612 | 5/1965 | West et al. | 166—42 X |
| 3,252,904 | 5/1966 | Carpenter | 166—42 X |
| 3,266,572 | 8/1966 | Woodward | 166—42 X |
| 3,270,815 | 9/1966 | Osborn et al. | 166—38 |

JACOB L. NACKENOFF, *Primary Examiner.*

S. J. NOVOSAD, *Assistant Examiner.*